(12) United States Patent
Kanenari et al.

(10) Patent No.: US 8,686,846 B2
(45) Date of Patent: Apr. 1, 2014

(54) TIRE CONDITION MONITORING SYSTEM

(75) Inventors: Daisuke Kanenari, Hiratsuka (JP); Yasuhiko Araki, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 274 days.

(21) Appl. No.: 12/796,885

(22) Filed: Jun. 9, 2010

(65) Prior Publication Data
US 2010/0328058 A1 Dec. 30, 2010

(30) Foreign Application Priority Data

Jun. 26, 2009 (JP) .................................. 2009-152690

(51) Int. Cl.
*B60C 23/00* (2006.01)

(52) U.S. Cl.
USPC ........... 340/447; 340/442; 152/151; 73/146.5

(58) Field of Classification Search
USPC ............... 340/447, 442, 425.5; 152/151, 450; 73/146.5, 146.3
See application file for complete search history.

(56) References Cited

U.S. PATENT DOCUMENTS

| | | | |
|---|---|---|---|
| 6,362,731 B1 * | 3/2002 | Lill | 340/445 |
| 6,788,193 B2 * | 9/2004 | King et al. | 340/447 |
| 7,423,532 B2 * | 9/2008 | Stewart et al. | 340/572.1 |
| 2003/0164758 A1 * | 9/2003 | King et al. | 340/442 |
| 2004/0099055 A1 * | 5/2004 | Komatsu et al. | 73/146 |
| 2004/0127180 A1 * | 7/2004 | Burke et al. | 455/161.3 |
| 2005/0134445 A1 * | 6/2005 | Ogawa et al. | 340/447 |
| 2005/0179530 A1 * | 8/2005 | Stewart et al. | 340/447 |
| 2010/0102945 A1 * | 4/2010 | Watson et al. | 340/462 |
| 2011/0304454 A1 * | 12/2011 | Lickfelt et al. | 340/447 |

FOREIGN PATENT DOCUMENTS

| | | |
|---|---|---|
| JP | 08-163467 | 6/1996 |
| JP | 11-078446 | 3/1999 |
| JP | 2002-107255 | 4/2002 |
| JP | 2005-254927 | 9/2005 |
| JP | 2008-087704 | 4/2008 |
| JP | 2009-078596 | 4/2009 |
| KR | 2000-14544 | 7/2000 |

* cited by examiner

*Primary Examiner* — George Bugg
*Assistant Examiner* — Edny Labbees
(74) *Attorney, Agent, or Firm* — Thorpe North & Western LLP

(57) ABSTRACT

The tire condition of each tire of a vehicle is detected, which information is transmitted by means of electromagnetic waves from the tire condition acquisition devices to a monitoring device that receives the electromagnetic waves transmitted from tire condition acquisition devices via a receiving antenna, which monitoring device contains means for displaying the electric field intensity of the electromagnetic waves transmitted from the tire condition acquisition devices. Thus, the electric field intensity at a mounting position can easily be determined when mounting the receiving antenna, enabling easy discovery of the optimal location for mounting the receiving antenna.

15 Claims, 10 Drawing Sheets

TIRE CONDITION MONITORING SYSTEM

PRIORITY CLAIM

This application is based upon and claims the benefit of priority from Japanese Patent Application No. 2009-152690, filed Jun. 26, 2009, the entire contents of which is incorporated herein by reference.

BACKGROUND

1. Technical Field

The present invention relates to a tire condition monitoring system for industrial vehicles such as trucks and trailers, and particularly relates to a tire condition monitoring system where an optimal mounting position of a receiving antenna can easily be determined.

2. Related Art

Conventionally, tire air pressure inspection management for vehicles has been important, and many accidents are caused by improper tire pressure. Therefore, tire condition monitoring systems are known that include a tire information acquisition device in each wheel that detects and transmits information regarding the air pressure in a wheel tire, and a monitoring device that acquires the tire air pressure information transmitted from the tire information acquisition devices in each tire, monitors the air pressure for each tire, and issues a warning when there is a problem with the air pressure.

However, compared to passenger vehicle models, industrial vehicles such as trucks and trailers have a wide variety of forms and many tires, and there is also a wide variety of cargo equipment for each vehicle. Therefore, propagation of electromagnetic waves varies for each vehicle, meaning that it requires time to search for a favorable position where the electromagnetic waves can be received when mounting a receiving antenna. This leads to extreme difficulty in determining the position where the receiving antenna is to be mounted.

An object of the present invention is to provide a tire condition monitoring system wherein the position where the receiving antenna is to be mounted can easily be determined.

SUMMARY

The present invention is a tire condition monitoring system including: condition detecting means for detecting a predetermined tire condition provided on each tire of a vehicle, a plurality of tire condition acquisition devices having transmission means for transmitting the detected tire condition information by electromagnetic waves, a receiving antenna for receiving the electromagnetic waves transmitted from the tire condition acquisition devices, and a monitoring device connected by a cable to the receiving antenna for receiving the tire condition information transmitted from each of the tire condition acquisition devices and displaying the tire condition information for each tire; the most important characteristic of which system is the inclusion of an electric field intensity display means for displaying an electric field intensity of the electromagnetic waves transmitted from each of the tire condition acquisition devices.

The tire condition monitoring system of the present invention enables simple determination of reception sensitivity at a mounting position when mounting the receiving antenna by providing the electric field intensity display means. Therefore, an optimal mounting position can be easily determined when mounting the receiving antenna.

DETAILED DESCRIPTION

Hereinafter, an embodiment of the present invention is described based on the accompanying drawings.

Figure 1:
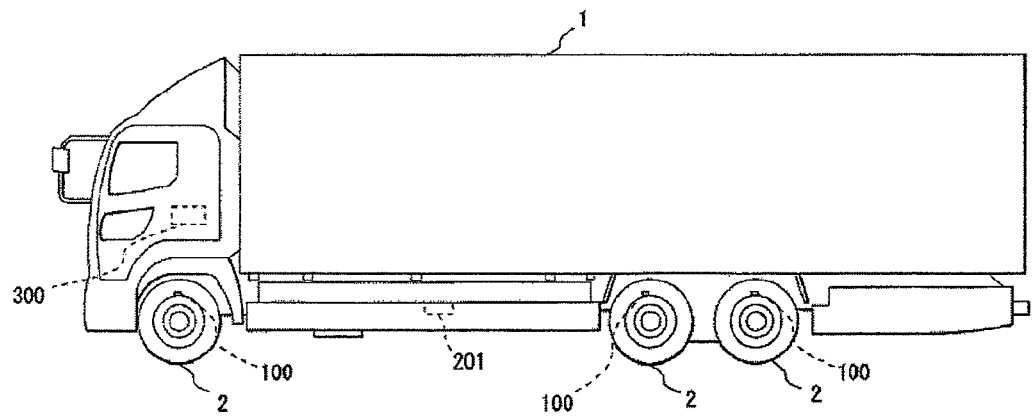
FIG. 1 is a side surface view showing an entire industrial vehicle equipped with a tire condition monitoring system according to a first embodiment of the present invention.
Figure 2:
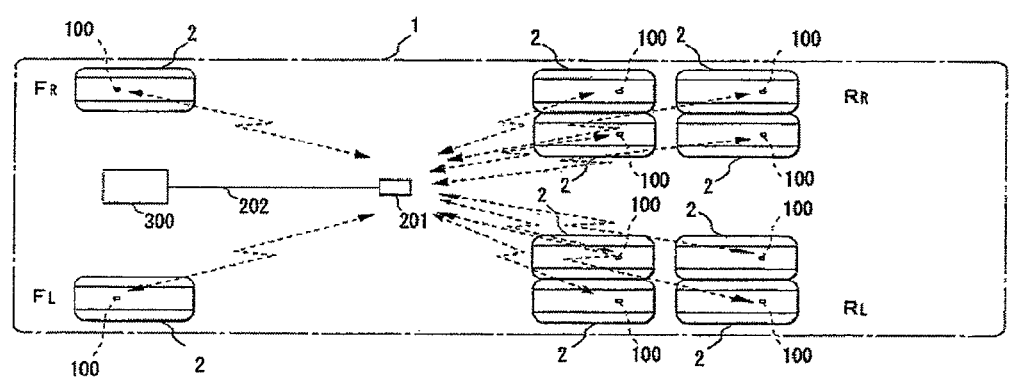
FIG. 2 is a component diagram showing the tire condition monitoring system according to the first embodiment of the present invention.
Figure 3:
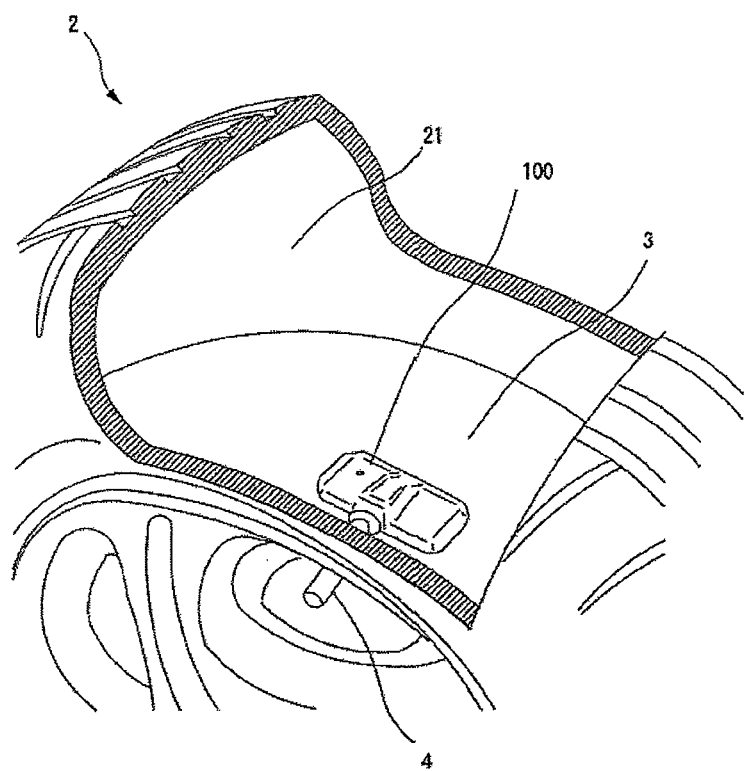
FIG. 3 is a view showing a tire condition acquisition device according to the first embodiment of the present invention in a mounted state on a tire.
Figure 4:
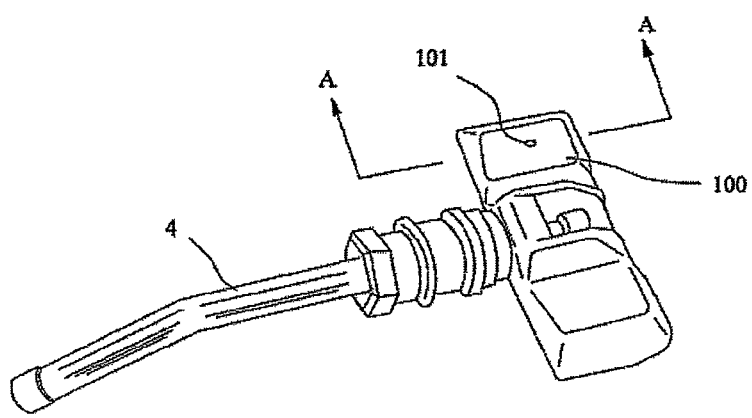
FIG. 4 is an external view showing the tire condition acquisition device according to the first embodiment of the present invention.
Figure 5:
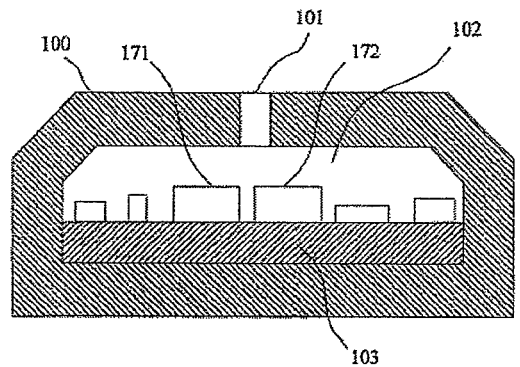
FIG. 5 is a cross-sectional view in a direction of arrow A-A in FIG. 4.

FIG. 1 is a side surface view showing an entire industrial vehicle equipped with a tire condition monitoring system according to a first embodiment of the present invention. FIG. 2 is a component diagram showing the tire condition monitoring system according to the first embodiment of the present invention. FIG. 3 is a diagram showing a tire condition acquisition device according to the first embodiment of the present invention in a mounted state upon a tire. FIG. 4 is an external view diagram showing the tire condition acquisition device according to the first embodiment of the present invention. FIG. 5 is a cross-sectional diagram in a direction of arrow A-A of FIG. 4.

In FIG. 1 and FIG. 2, 1 is an industrial vehicle such as a truck or trailer. Tire condition acquisition devices 100 that detect tire conditions and transmit the conditions so detected by electromagnetic waves are provided in each of ten tires 2.

Furthermore, a monitoring device 300, containing a controller and a display panel and connected by a coaxial cable 202 to an antenna 201 that receives the electromagnetic waves transmitted from the tire condition acquisition devices 100 and displays detection results on the display panel based on received signals is provided in proximity to a driver's seat.

Note that in the present embodiment, the tire condition monitoring system includes the tire condition acquisition devices 100 that detect air pressure and temperature inside of air chambers 21 of the tires 2, and displays the detection results on the display panel of the monitoring device 300. However, a tire condition monitoring system that detects and displays tire conditions other than air pressure and temperature is also possible.

The tire condition acquisition devices 100 are attached at predetermined positions on a rim 3 inside the air chamber 21 of each of the tires 2 as described above, detect the pressure and the temperature inside the air chamber 21 of each of the tires 2 using pressure detection elements and temperature detection elements (described later) provided inside the tire condition acquisition devices 100, and convert the detection results to digital values. Furthermore, the tire condition acquisition devices 100 generate and transmit digital information containing these digital values. The digital information includes unique identifying information for each of the tire condition acquisition devices 100 in addition to the digital values of the detection results.

Note that in the present embodiment, the tire condition acquisition devices 100 are mounted on an edge of a tire interior side of a valve stem 4 that is mounted in the rim 3, as shown in FIG. 3 and FIG. 4, and are positioned along a surface of the rim 3. Furthermore, as shown in FIG. 4 and FIG. 5, a housing of the tire condition acquisition devices 100 has a ventilation hole 101 that connects to an inner space 102 inside the housing. Furthermore, a circuit board 103 containing an air pressure sensor 171 and a temperature sensor 172 is mounted in the inner space 102 of the housing.

Figure 6:
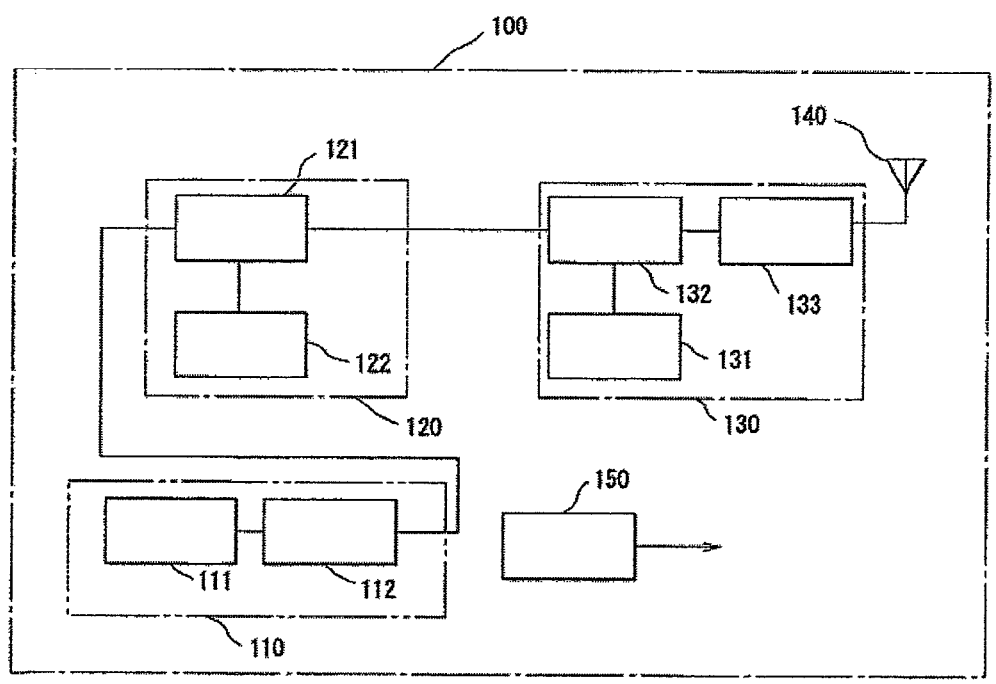
FIG. 6 is a block diagram showing an electrical system circuit of the tire condition acquisition device according to the first embodiment of the present invention.

A specific example of an electrical circuit of the tire condition acquisition devices 100 is illustrated in FIG. 6. Specifically, in the specific example illustrated in FIG. 6, the electrical circuit of the tire condition acquisition devices 100 contains a sensor unit 110, a central processor 120, a transmitter 130, an antenna 140, and a battery 150.

The sensor unit 110 contains an air pressure sensor 111 and an A/D converter circuit 112.

The air pressure sensor 111 detects a pressure of the air inside the tire 2, and outputs the detection results as an analog electric signal. The air pressure sensor 111 can be any common commercial device.

The A/D converter circuit 112 converts the analog electric signal output from the air pressure sensor 111 to a digital signal, and outputs the digital signal to a CPU 121. The digital signal corresponds to an air pressure value of the tire 2.

The central processor 120 contains a common CPU 121 and a memory unit 122.

The CPU 121 operates based on a program stored in a semiconductor memory of the memory unit 122, and transmits data detected by the sensor unit 110 to a monitoring device 200 at predetermined time intervals (for example five minutes) when electrical power is supplied. Furthermore, the memory unit 122 is pre-programmed with the unique identifying information of the tire condition acquisition device 100, and the CPU 121 transmits the unique identifying information along with the detection data to the monitoring device 200.

The memory unit 122 contains read-only memory (ROM) pre-programmed with the program that drives the CPU 121 and non-volatile semiconductor memory that can be electrically rewritten such as electrically erasable programmable read-only memory (EEPROM). The unique identifying information of each of the tire condition acquisition devices 100 is pre-programmed in a non-rewritable predetermined region in the memory unit 122 at the time of manufacture.

The transmitter 130 contains an oscillator circuit 131, a modulation circuit 132, and a high-frequency amplifier circuit 133, and uses the modulation circuit 132 to modulate carrier waves generated by the oscillator circuit 131 containing a standard PLL circuit or the like (for example, carrier waves with a predetermined frequency band of 315 MHz), and transmit the modulated carrier waves to the antenna 140 as a high-frequency current of the predetermined frequency band of 315 MHz through the high-frequency amplifier circuit 133.

Furthermore, the modulation circuit 132 modulates the carrier waves based on the transmitted data, and outputs the carrier waves to the high-frequency amplifier circuit 133.

Note that in the present embodiment, the frequency is set to the frequency band of 315 MHz, but different frequency bands are also possible. Furthermore, the modulation method of the modulation circuit 132 can be amplitude shift keying modulation (ASK), frequency modulation (FM), frequency shift keying modulation (FSK), phase modulation (PM), phase shift keying (PSK), and the like.

The antenna 140 is for communicating with the monitoring device 200 using electromagnetic waves and in the present embodiment is set to the predetermined frequency band of 315 MHz, as described above.

The battery 150 is, for example, a secondary battery or the like, and supplies each unit with electrical energy necessary for powering the tire condition acquisition devices 100.

Note that if the tire condition acquisition devices 100 are embedded inside the tires 2 when the tires 2 are manufactured, an IC chip or other components shall of course be designed so as to sufficiently withstand heat during vulcanization.

Figure 7:
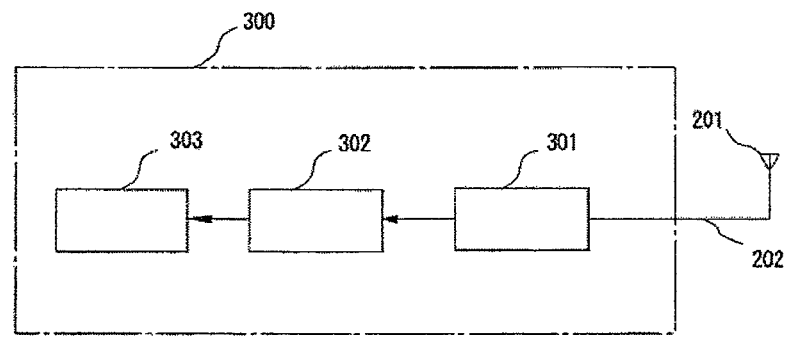
FIG. 7 is a block diagram showing an electrical system circuit of the monitoring device according to the first embodiment of the present invention.

As shown in FIG. 7 an electrical circuit of the monitoring device 300 contains a receiver 301, an arithmetic logical unit 302, and a display device 303. The arithmetic logical unit 302 contains a commonly known CPU, and a memory circuit containing ROM that stores a program for operating the CPU and RAM required for arithmetic processing.

The receiver 301 receives and demodulates the electromagnetic waves at the predetermined frequency of the 315 MHz band based on commands from the arithmetic logical unit 302, then converts an electric field intensity (RSSI) of a signal obtained by demodulation and information included in the signal into a digital signal, which is then output.

The arithmetic logical unit 302 stores the unique identifying information of each of the tire condition acquisition devices 100 attached to the tires 2 that is associated with a number for a mounting position of each of the tires 2, calculates an air pressure value and a temperature value for each of the tires 2 based on the digital signal input from the receiver 301, and, based on the unique identifying information, associates these values with the number for the mounting position of each of the tires 2, stores the same, and outputs these values to a display unit of the display device 303.

Furthermore, the arithmetic logical unit 302 displays the electric field intensity (RSSI) of the electromagnetic waves transmitted from each of the tire condition acquisition devices 100 on the display unit of the display device 303, based on a switch operation of the display device 303. Therefore, the electric field intensity at the mounting position (reception sensitivity) can easily be determined when mounting the receiving antenna 201, enabling easy discovery of an optimal position for mounting the receiving antenna 201.

Next, an example of a display in the monitoring device 300 of the electric field intensity (RSSI) of the electromagnetic waves received from each of the tire condition acquisition devices 100 is described.

Example 1

Figure 8:
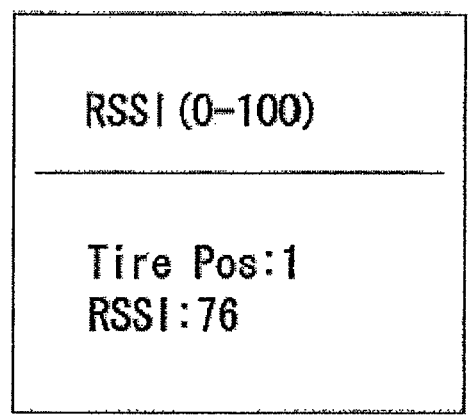
FIG. 8 is an illustration showing an example of an electric field intensity display according to the first embodiment of the present invention.

Example 1 is an example of a text-only display as shown in FIG. 8, wherein RSSI, representing electric field intensity, and a value of the electric field intensity expressed as a percentage between 0 and 100 are displayed together as "RSSI (0-100)" at the top of a display screen. Furthermore, at the bottom of the display screen, a number representing a position of a tire 2 is displayed as "Tire Pos: 1," and the electric field intensity is displayed as "RSSI: 76". This indicates that the electric field intensity (RSSI) of electromagnetic waves transmitted from a tire condition acquisition device 100 attached to the tire 2 mounted in a position 1 is 76. In this example, the number of the tire 2 (tire condition acquisition device 100) and the associated electric field intensity displayed on the screen can be switched by operating a switch on a display device 303. The value for the electric field intensity can also be displayed with color so that a strength or weakness of the electric field intensity due to differences in electric field intensity can be distinguished by color.

Example 2

Figure 9:
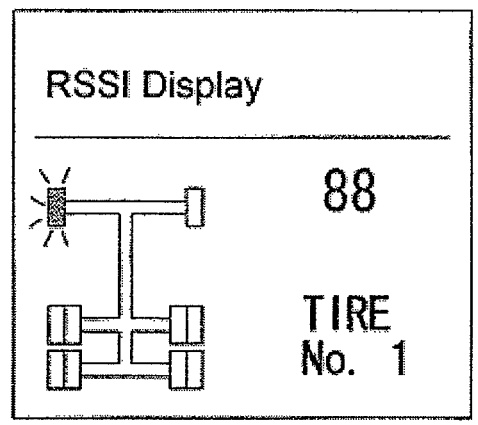
FIG. 9 is an illustration showing an example of an electric field intensity display according to the first embodiment of the present invention.

Example 2 is an example of a text and image display as shown in FIG. 9, wherein the electric field intensity is displayed at the top of the display screen as "RSSI Display". Furthermore, the positions of all of the tires 2 mounted on a vehicle 1 are displayed at the bottom left side of the display screen as an image, and the tire 2 at a position of the electric field intensity value being displayed is shown with increased brightness. Furthermore, the electric field intensity is displayed as "88" at the bottom right side of the display screen, and the number representing the position of the tire 2 to which the tire condition acquisition device 100 transmitting the electromagnetic waves of the electric field intensity being displayed is attached is displayed as "Tire No. 1". In this manner, expressing the position of the tire 2 as an image enables easy visual confirmation of the position of the tire 2 whose electric field intensity is displayed. In this example, similarly to Example 1, the number of the tire 2 (tire condition acquisition device 100) and the associated electric field intensity displayed can be switched by operating the switch on the display device 303.

Example 3

Figure 10:
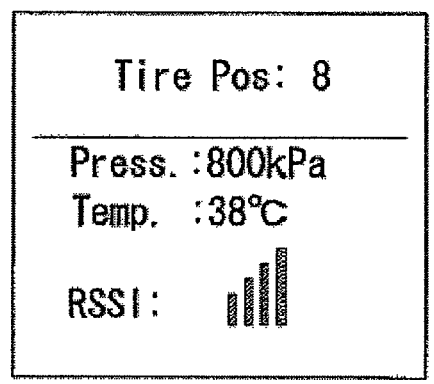
FIG. 10 is an illustration showing an example of an electric field intensity display according to the first embodiment of the present invention.

In Example 3, air pressure and temperature values of the tire 2 are shown along with the electric field intensity as illustrated in FIG. 10. The number representing the position of the tire 2 to which the tire condition acquisition device 100 transmitting the electromagnetic waves of the electric field intensity displayed is attached is displayed as "Tire Pos: 8" at the top of the display screen. Furthermore, at the bottom of the display screen, the air pressure in the tire 2 of 800 kPa is displayed as "Press.: 800 kPa", the temperature in the tire 2 of 38° C. is displayed as "Temp.: 38° C.", and the electric field intensity (RSSI) of the electromagnetic waves transmitted from the tire condition acquisition device 100 attached to the tire 2 (Tire No. 8) is displayed as a four-bar graph. A number of bars displayed for the electric field intensity is the same as in a method used to display electromagnetic wave reception strength in standard cellular phones, and therefore is easily understandable. When the electric field intensity is displayed on the same screen as the air pressure and the temperature, three values can be confirmed simultaneously. The strength or weakness of the electric field intensity can also be represented by a size of an image such as a circle or square rather than a number of bars in a bar graph.

Example 4

Figure 11:
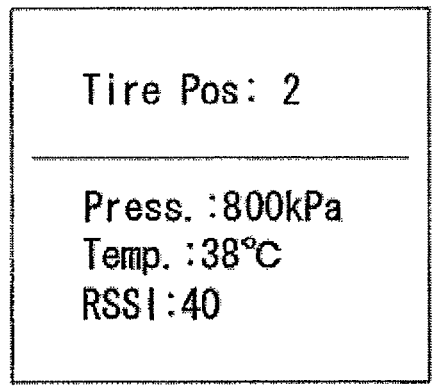
FIG. 11 is an illustration showing an example of an electric field intensity display according to the first embodiment of the present invention.

In Example 4, the air pressure and temperature values of the tire 2 as well as the electric field intensity are all displayed as text, as shown in FIG. 11. The number representing the position of the tire 2 to which the tire condition acquisition device 100 transmitting the electromagnetic waves of the electric field intensity being displayed is attached is displayed as "Tire Pos: 2" at the top of the display screen. Furthermore, at the bottom of the display screen, the air pressure in the tire 2 of 800 kPa is displayed as "Press.: 800 kPa", a temperature in the tire 2 of 38° C. is displayed as "Temp.: 38° C.", and the electric field intensity (RSSI) 40 of the electromagnetic waves transmitted from the tire condition acquisition device 100 attached to the tire 2 (Tire No. 2) is displayed as "RSSI: 40".

Example 5

Figure 12:
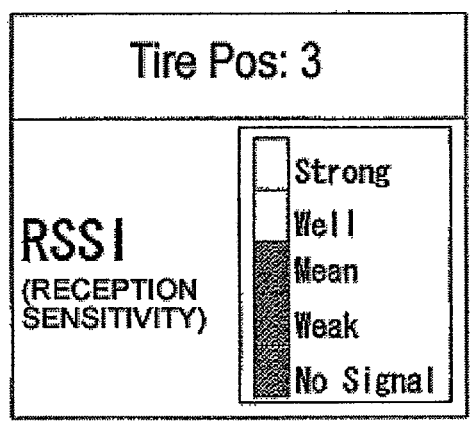
FIG. 12 is an illustration showing an example of an electric field intensity display according to the first embodiment of the present invention.

In Example 5, the strength or weakness of the electric field intensity is represented by a five-grade color scale, as shown in FIG. 12. Specifically, the number representing the position of the tire 2 to which the tire condition acquisition device 100 transmitting the electromagnetic waves of the electric field intensity on display is attached is displayed as "Tire Pos: 3" at the top of the display screen. Furthermore, text reading, "RSSI (reception sensitivity)", indicating the electric field intensity is shown at the bottom left side of the display screen, and the strength or weakness of the electric field intensity is indicated by means of the five-grade color scale at the bottom right side of the display screen. Specifically, when the electric field intensity is strongest, "Strong" is indicated with red; when the electric field intensity is good, "Well" is indicated with yellow; when the intensity is average, "Mean" is indicated with green; when the intensity is weak, "Weak" is indicated with blue, and when the electric field intensity is lower than a sensitivity limit for reception, "No Signal" is indicated with white. Displaying the electric field intensity using the five-grade color scale in this manner allows easy visual confirmation of the strength or weakness of the electric field intensity.

Example 6

Figure 13:
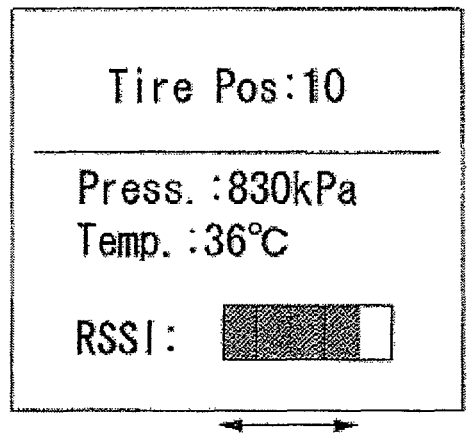
FIG. 13 is an illustration showing an example of an electric field intensity display according to the first embodiment of the present invention.

In Example 6, the air pressure and temperature values of the tire 2 are shown using text, and the electric field intensity is expressed by a number of lights such as commonly known LED indicators, as shown in FIG. 13. Specifically, the number representing the position of the tire 2 to which the tire condition acquisition device 100 transmitting the electromagnetic waves of the electric field intensity displayed is attached is displayed as "Tire Pos: 10" at the top of the display screen. At the bottom of the display screen, the air pressure of 830 kPa in the tire 2 is displayed as "Press.: 830 kPa" and a temperature of 36° C. in the tire 2 is displayed as "Temp.: 36° C.". Furthermore, the electric field intensity (RSSI) of the electromagnetic waves being transmitted from the tire condition acquisition device 100 attached to the tire 2 (Tire No. 10) is expressed by the text, "RSSI:", and a horizontal band of light to the right of the text. This method of expressing the electric field intensity as an area of a band demonstrates even more excellent visibility.

Example 7

Figure 14:
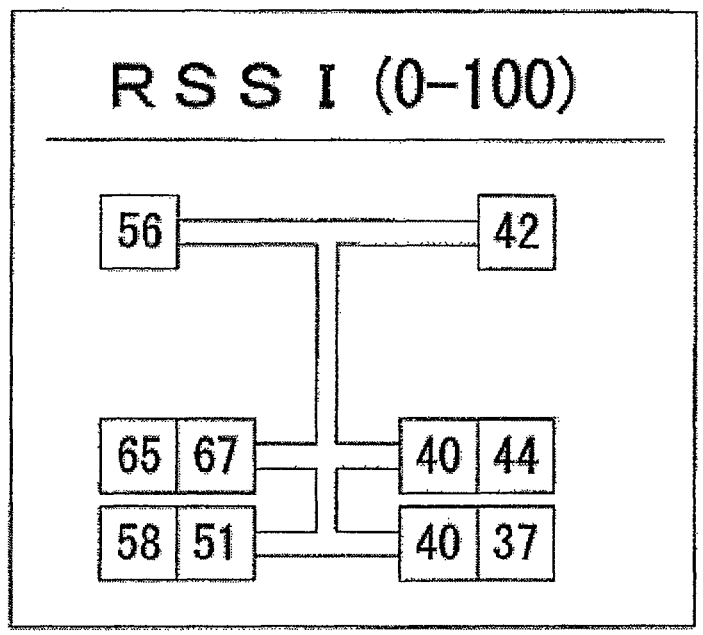
FIG. 14 is an illustration showing an example of an electric field intensity display according to the first embodiment of the present invention.

In Example 7, the electric field intensity is shown using text in an image showing a layout of the tire positions of the tires 2, as shown in FIG. 14. Specifically, RSSI, representing the electric field intensity, and the value of the electric field intensity expressed as a percentage from 0 to 100, are displayed together as "RSSI (0-100)" at the top of the display screen. Furthermore, the positions of all of the tires 2 attached to the vehicle 1 are displayed as an image at the bottom of the display screen, with the electric field intensity values being displayed as numerical values in rectangles representing each of the tires 2. Displaying the positions of the tires 2 as an image and the electric field intensities as numerical values at the positions of each of the tires 2 in this manner allows the electric field intensity for each of the tires 2 to be visually confirmed simultaneously, allowing easy determination of the optimal position for attaching the antenna.

Example 8

Figure 15:
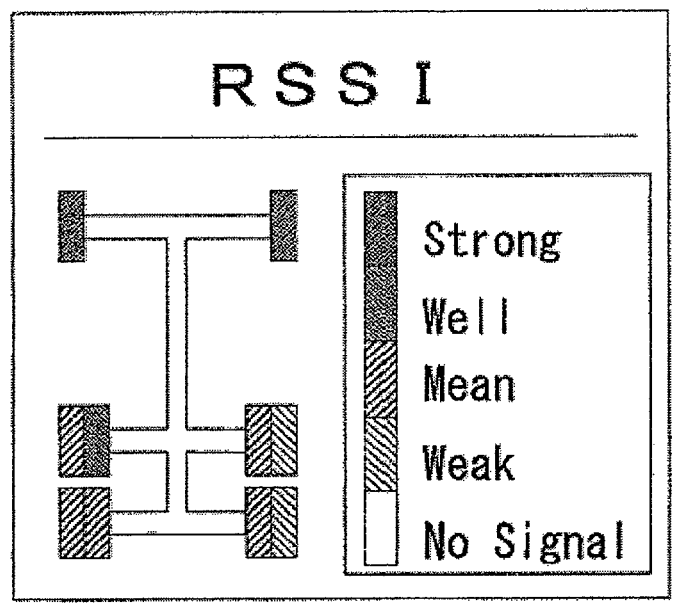
FIG. 15 is an illustration showing an example of an electric field intensity display according to the first embodiment of the present invention.

In Example 8, the electric field intensity is represented using color in an image showing a layout of the tire positions of the tires 2, as shown in FIG. 15. Specifically, "RSSI", representing the electric field intensity, at the top of the display screen indicates that the electric field intensity (RSSI) is being displayed. Furthermore, the positions of all of the tires 2 attached to the vehicle 1 are displayed as an image at the bottom of the display screen, with the electric field intensity being indicated by means of a five-grade color scale in rectangles representing each of the tires 2. Here, when the electric field intensity is strongest, "Strong" is indicated with red; when the electric field intensity is good, "Well" is indicated with yellow; when the intensity is average, "Mean" is indicated with green; when the intensity is weak, "Weak" is indicated with blue, and when the electric field intensity is lower than the sensitivity limit for reception, "No Signal" is indicated with white. Displaying the positions of the tires 2 as an image and the electric field intensity by means of the five-grade color scale in this manner enables easy and simultaneous visual confirmation of the electric field intensity for each of the tires 2, allowing for easy determination of the optimal position for attaching the antenna.

Note that expressing the electric field intensity in terms of its true value or in dBm will produce difficult-to-interpret decimals or negative numbers. As such, the value is preferably indicated as an integer corresponding to a fixed fraction (such as a percentage) of a practical range. Furthermore, as described above, a method of indication by displaying a number of bars or an area as is used in cell phones is also preferable.

Next, a second embodiment of the present invention will be described.

Figure 16:
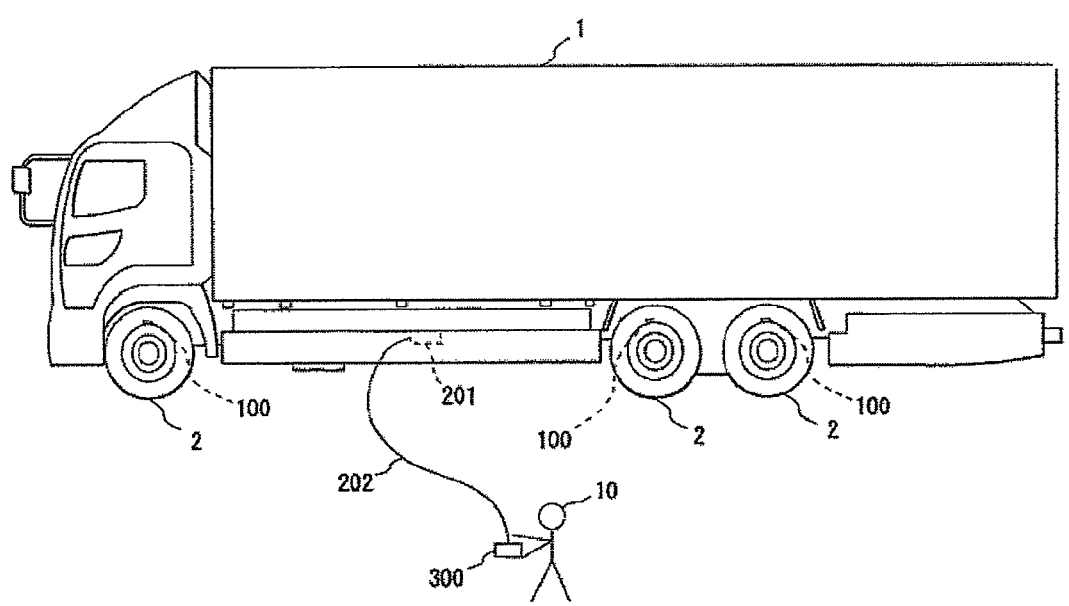
FIG. 16 is a side surface view showing an entire industrial vehicle equipped with a tire condition monitoring system according to a second embodiment of the present invention.
Figure 17:
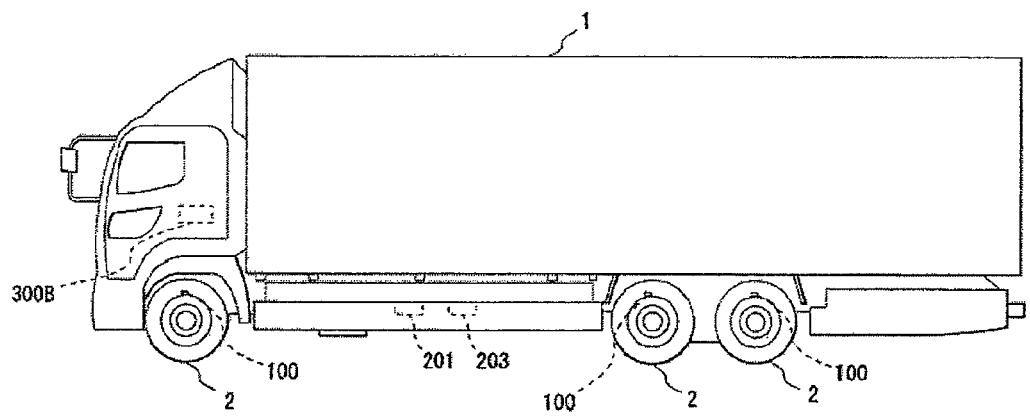
FIG. 17 is a side surface view showing an entire industrial vehicle equipped with a tire condition monitoring system according to a third embodiment of the present invention.
Figure 18:
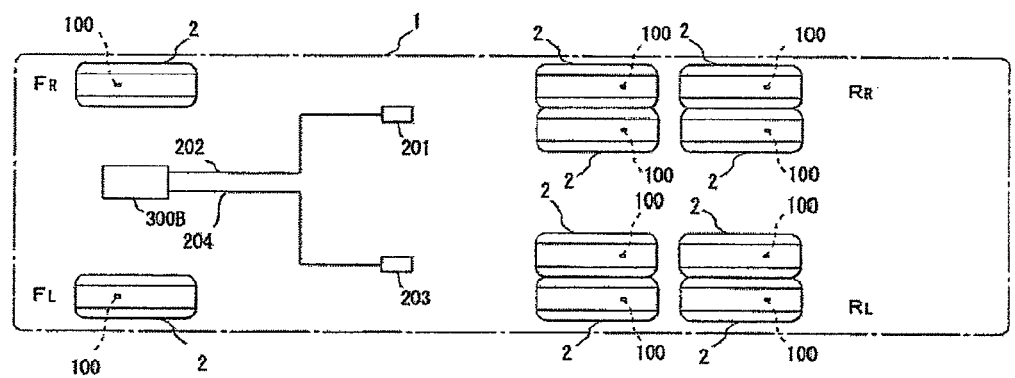
FIG. 18 is a component diagram showing the tire condition monitoring system according to the third embodiment of the present invention.
Figure 19:
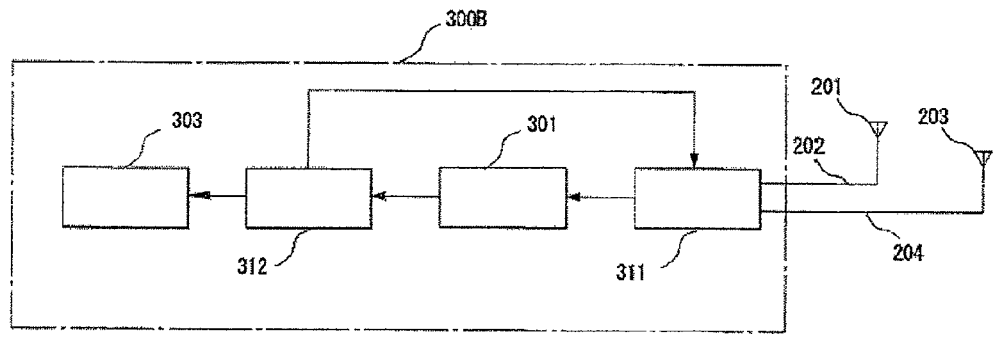
FIG. 19 is a block diagram showing an electrical system circuit of the monitoring device according to the third embodiment of the present invention.

In the second embodiment, a user 10 can carry a monitoring device 300 while it is operating mode, as shown in FIG. 16. With this construction, the user 10 can adjust a position of a receiving antenna 201 while viewing a display screen of the monitoring device 300, enabling a position for attaching the antenna with optimal electromagnetic wave reception to be quickly and easily found.

An electric field intensity display device that can be carried while in operating mode as described above can also be provided in addition to the monitoring device 300 that is mounted in the vehicle 1. In other words, the electric field intensity display device can be configured as the monitoring device 300 of a tire condition monitoring system, but it is also possible to configure a separate external device that can be used independently. This method allows the electric field intensity value to be confirmed while adjusting the antenna position even if only a single operator is present without requiring the operator to go check the monitoring device 300 inside the vehicle each time when determining where to attach the receiving antenna 201.

Next, a third embodiment of the present invention will be described.

In the third embodiment, as shown in FIG. 17 through FIG. 20, a tire condition monitoring system has a monitoring device 300B that has two receiving antennas 201, 203 to perform what is commonly known as diversity reception. Specifically, a vehicle 1 has two receiving antennas 201, 203, with one receiving antenna 201 being connected to the monitoring device 300B by a coaxial cable 202, and another receiving antenna 203 being connected to the monitoring device 300B by a coaxial cable 204. Note that the receiving antennas 201, 203 are located at different positions.

The monitoring device 300B contains a switching unit 311 that switches based on commands from an arithmetic logical unit 312, a receiver 301, an arithmetic logical unit 312, and a display unit 303. Note that in the drawings, parts with the same construction as in the first embodiment are assigned the same reference numbers.

The switching unit 311 selects either the antenna 201 or the antenna 203 based on commands from the arithmetic logical unit 312, and connects the selected antenna to the receiver 301.

The receiver 301 receives and demodulates the electromagnetic waves at a predetermined frequency of the 315 MHz band based on commands from the arithmetic logical unit 312, then converts an electric field intensity (RSSI) of a signal obtained by demodulation and information included in the signal into a digital signal, which is then output to the arithmetic logical unit 312.

Figure 20:
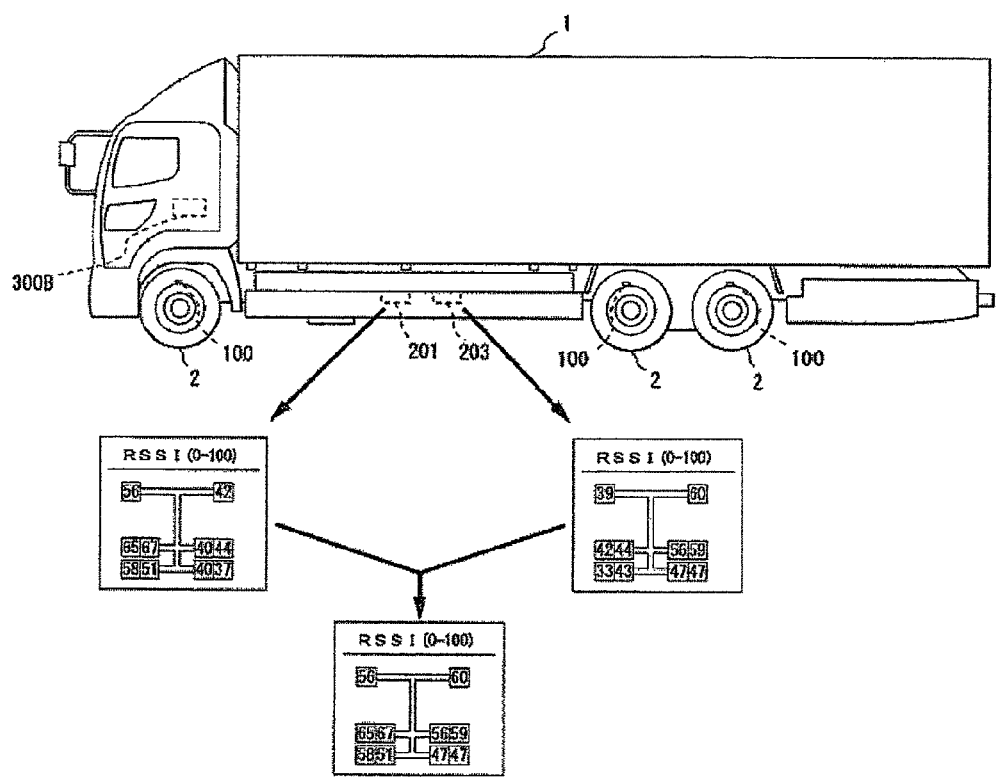
FIG. 20 is an illustration showing an example of an electric field intensity display according to the third embodiment of the present invention.

The arithmetic logical unit 312 stores the unique identifying information of each of the tire condition acquisition devices 100 attached to the tires 2 that is associated with a number for the mounting position of each of the tires 2. When electrical energy is supplied from a vehicle power supply and operation begins, switching and connecting statuses of the antennas 201, 203 are controlled by the switching unit 311, an air pressure value and a temperature value for each of the tires 2 is calculated based on the digital signal input from the receiver 301, and, based on the unique identifying information, these values are associated with the number for the mounting position of each of the tires 2, stored, and output to a display unit of a display device 303. At this time, as shown in FIG. 20, the arithmetic logical unit 312 associates the data for the electric field intensity of the electromagnetic waves transmitted from the tire condition acquisition devices 100 and received by the antenna 201 with the positions of the tires 2 (unique identifying information for the tire condition acquisition devices 100), and associates the data for the electric field intensity of the electromagnetic waves transmitted from the tire condition acquisition devices 100 and received by the antenna 203 with the positions of the tires 2 (unique identifying information for the tire condition acquisition devices 100). The larger of the two electric field intensities for each of the tires 2 (tire condition acquisition devices 100) is then selected and displayed on a display unit of the display device 303. Furthermore, the arithmetic logical unit 312 selects one of the antennas 201, 203 based on which of the two electric field intensities obtained for each of the tires 2 (tire condition acquisition devices 100) is larger for reception, and receives the electromagnetic waves using the selected antenna.

Note that the antennas 201, 203 can be selected by a switch provided on the monitoring device 300B to display the associated electric field intensity. Therefore, the electric field intensity at the mounting position for each of the antennas 201, 203 can easily be confirmed when mounting the receiving antennas 201, 203, enabling easy determination of the optimal mounting position for the receiving antennas 201, 203.

Furthermore, in the third embodiment, the electric field intensity display format described in Example 7 of the first embodiment was used, but the present invention is not restricted thereto, and it goes with out saying that the display formats described in other examples can be used.

What is claimed is:

1. A tire condition monitoring system, comprising:
   a condition detector for detecting a predetermined tire condition, provided on each tire of a vehicle;
   a plurality of tire condition acquisition devices having a transmission device for transmitting the detected tire condition information by electromagnetic waves;
   receiving antenna for receiving the electromagnetic waves transmitted from each of the tire condition acquisition devices, wherein the receiving antenna is centrally located on the vehicle and wherein the receiving antenna comprises a plurality of receiving antennas fewer in number than the plurality of tire condition acquisition devices; and
   a monitoring device, which is connected by a cable to the receiving antenna, for receiving the tire condition information transmitted from each of the tire condition acquisition devices and displaying the tire condition information for each tire;
   wherein an electric field intensity display is provided for displaying an electric field intensity of the electromagnetic waves transmitted from each of the tire condition acquisition devices,
   wherein the electric field intensity display switches between display of electric field intensities for different tires of the vehicle, and
   the electric field intensity display is configured to simultaneously display the electric field intensity and text indicating both an air pressure and temperature of a selected tire.

2. The tire condition monitoring system according to claim 1, wherein the electric field intensity display displays the electric field intensity using either numbers that express a value of the electric field intensity or a diagram that changes in relation to the value of the electric field intensity.

3. The tire condition monitoring system according to claim 1, wherein the electric field intensity display simultaneously displays on a single screen each of the electric field intensities of the electromagnetic waves transmitted from the plurality of tire condition acquisition devices.

4. The tire condition monitoring system according to claim 1, wherein the electric field intensity display simultaneously displays, using text, the electric field intensities of electromagnetic waves transmitted from the plurality of tire condition acquisition devices on a screen that schematically displays positions of a plurality of tires mounted on the vehicle.

5. The tire condition monitoring system according to claim 1, wherein the electric field intensity display can operate under a condition of being connected by a cable to the receiving antenna and is constructed so as to be portable while still in operating mode.

6. The tire condition monitoring system according to claim 1, wherein each of the tire condition acquisition devices is associated with a unique identification information which is stored in a memory of the monitoring device for recognition when the tire condition information transmitted from each of the tire condition acquisition devices, the tire condition information including the unique identification information.

7. The tire condition monitoring system according to claim 1, wherein the electric field intensity display is configured to represent a strength of the electric field intensity according to color.

8. The tire condition monitoring system according to claim 1, wherein the condition detector is embedded inside tires of the vehicle and is selected to withstand vulcanization heat when vulcanizing the tires.

9. The tire condition monitoring system according to claim 1, wherein the electric field intensity display is configured to display a tire number representing the tire associated with the displayed electric field intensity.

10. The tire condition monitoring system according to claim 1, wherein the electric field intensity display is configured to display the electric field intensity as a graph or an image.

11. The tire condition monitoring system according to claim 1, wherein the electric field intensity display is configured to display the electric field intensity as text or numerical values that are a fixed fraction of an actual value.

12. The tire condition monitoring system according to claim 1, wherein a position of the receiving antenna is adjustable.

13. The tire condition monitoring system according to claim 1, wherein the receiving antenna comprises a plurality of receiving antennas for receiving a signal from an individual of the tires and the monitoring device is configured to use a signal from the receiving antenna with a greatest strength signal intensity.

14. A tire condition monitoring system, comprising:
   a condition detector for detecting a tire condition, provided on each tire of a vehicle;
   a plurality of tire condition acquisition devices on each tire having a transmission device for transmitting the detected tire condition information as signals by electromagnetic waves;
   a plurality of receiving antennas for receiving the electromagnetic waves transmitted from each of the tire condition acquisition devices, respectively, wherein the plurality of receiving antenna are centrally located on the vehicle and fewer in number than the plurality of tire condition acquisition devices with the transmission devices; and a monitoring device, which is connected by a cable to the plurality of receiving antennas, respectively, for receiving the tire condition information transmitted from each of the tire condition acquisition devices and simultaneously displaying the tire condition information for each tire, the monitoring device being configured to determine an electric field intensity of the signals and to use an individual signal with a greatest electric field intensity from amount the signal received by the plurality of receiving antennas for each of the tire acquisition devices;

wherein an electric field intensity display is provided for displaying an electric field intensity of the electromagnetic waves transmitted from each of the tire condition acquisition devices and the electric field intensity display displays the greatest electric field intensity of the individual signal from among the electromagnetic waves received by the plurality of receiving antennas when displaying the electric field intensity of the electromagnetic waves received from each of the tire condition acquisition devices.

15. A tire condition monitoring system, comprising:

a condition detector for detecting a predetermined tire condition, provided on each tire of a vehicle;

a plurality of tire condition acquisition devices having a transmission device for transmitting the detected tire condition information by electromagnetic waves;

a receiving antenna for receiving the electromagnetic waves transmitted from the tire condition acquisition devices; and a monitoring device, which is connected by a cable to the receiving antenna, for receiving the tire condition information transmitted from each of the tire condition acquisition devices and displaying the tire condition information for each tire;

wherein an electric field intensity display is provided which displays the position of the tires mounted on the vehicle as an image and an electric field intensity of the electromagnetic waves transmitted from each of the tire condition acquisition devices, the electric field intensity display switches between display of electric field intensities for different tires of the vehicle, the electric field intensity display displays a position corresponding to one of the tires elected by the switching, with increased brightness on the image as compared with positions for other of the tires, and the electric field intensity display simultaneously displays at least one of the electric field intensity, an air pressure and a temperature of the tire elected by the switching, on the same display screen at a different position from the image.

* * * * *